US011355088B2

United States Patent
Tung

(10) Patent No.: US 11,355,088 B2
(45) Date of Patent: Jun. 7, 2022

(54) DISPLAY DRIVER DEVICE AND OPERATING METHOD FOR DISPLAY DRIVER DEVICE AND A DISPLAY DEVICE

(71) Applicant: Novatek Microelectronics Corp., Hsinchu (TW)

(72) Inventor: Chia-Hsin Tung, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 28 days.

(21) Appl. No.: 16/817,619

(22) Filed: Mar. 13, 2020

(65) Prior Publication Data

US 2020/0294473 A1 Sep. 17, 2020

Related U.S. Application Data

(60) Provisional application No. 62/818,115, filed on Mar. 14, 2019.

(51) Int. Cl.
*G09G 5/36* (2006.01)
*G06T 13/80* (2011.01)

(52) U.S. Cl.
CPC ............ *G09G 5/363* (2013.01); *G06T 13/80* (2013.01); *G09G 2310/08* (2013.01); *G09G 2330/021* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 10,366,669 B2 | 7/2019 | Bae et al. | |
| 10,438,540 B2 | 10/2019 | Yang et al. | |
| 10,497,329 B2 * | 12/2019 | Lee | G09G 3/3614 |
| 10,643,545 B2 | 5/2020 | Bae et al. | |
| 10,809,791 B2 | 10/2020 | Kim et al. | |

(Continued)

FOREIGN PATENT DOCUMENTS

| | | |
|---|---|---|
| CN | 108304151 | 7/2018 |
| CN | 108702480 | 10/2018 |
| WO | 2017074078 | 5/2017 |

OTHER PUBLICATIONS

"Office Action of Taiwan Counterpart Application", dated May 24, 2021, p. 1-p. 12.

*Primary Examiner* — Yi Wang
(74) *Attorney, Agent, or Firm* — JCIPRNET

(57) ABSTRACT

A display driver device including a driver circuit and a control circuit is provided. The driver circuit is configured to drive a display panel to display an animated image for a display period under an always on display mode according to display information of the animated image stored in a storage circuit. The display period includes a writing period and a non-writing period after the writing period. The control circuit is configured to write the display information of the animated image received from an external device into the storage circuit during the writing period of the display period. The control circuit is configured to stop receiving the display information from the external device and writing any display information into the storage circuit during the non-writing period of the display period. A display device including the display driver device and an operating method for the display driver device are also provided.

41 Claims, 13 Drawing Sheets

(56) References Cited

U.S. PATENT DOCUMENTS

| | | | |
|---|---|---|---|
| 2015/0277545 A1* | 10/2015 | Flowers | G06F 9/545 |
| | | | 713/323 |
| 2016/0329033 A1* | 11/2016 | Woo | G09G 3/20 |
| 2017/0116927 A1 | 4/2017 | Bae et al. | |
| 2017/0263206 A1 | 9/2017 | Bae et al. | |
| 2018/0203500 A1 | 7/2018 | Kim et al. | |
| 2018/0240260 A1* | 8/2018 | Lee | G06F 1/3293 |
| 2019/0279601 A1* | 9/2019 | Chen | G09G 5/395 |
| 2020/0265784 A1 | 8/2020 | Bae et al. | |
| 2020/0393957 A1* | 12/2020 | Wilson | G04C 3/001 |
| 2021/0082330 A1* | 3/2021 | Bae | G09G 5/00 |

\* cited by examiner

| W1H1 A0 | A1 | A2 | A3 |
|---|---|---|---|
| Ai-3 | Ai-2 | Ai-1 | Ai |
| W2H2 B0 | ... | Bj | |
| W3H3 C0 | C1 | ... | |
| Ck-1 | Ck | | |

DISPLAY DRIVER DEVICE AND OPERATING METHOD FOR DISPLAY DRIVER DEVICE AND A DISPLAY DEVICE

CROSS-REFERENCE TO RELATED APPLICATION

This application claims the priority benefit of U.S. provisional application Ser. No. 62/818,115, filed on Mar. 14, 2019. The entirety of the above-mentioned patent application is hereby incorporated by reference herein and made a part of this specification.

BACKGROUND

Technical Field

The invention relates to a display driver device and a display device and an operating method for a display driver device, more specifically, to a display driver device and a display device and an operating method for a display driver device capable of displaying an animated image under an always on display (AOD) mode.

Description of Related Art

In recent years, a display device such as a smartphone can usually provide an AOD mode for users. Since the display device must display a specified image under the AOD mode for a long time, power consumption is an important issue for the display device. For reducing the power consumption, it is necessary to decrease the times of waking up an application processor (AP) of the display device and data transmission between the AP and a display driver device. As such, the display device in related arts simply displays a static image under the AOD mode to reduce the power consumption. However, user experience cannot be satisfied.

SUMMARY

The invention is directed to a display driver device and a display device capable of displaying an animated image under the AOD mode and having power-saving property.

An embodiment of the invention provides a display driver device including a driver circuit and a control circuit. The driver circuit is configured to drive a display panel to display an animated image for a first display period under an always on display mode according to display information of the animated image stored in a storage circuit. The first display period includes a first writing period and a first non-writing period after the first writing period. The control circuit is coupled to the storage circuit. The control circuit is configured to write the display information of the animated image received from an external device into the storage circuit during the first writing period of the first display period. The control circuit is configured to stop receiving the display information from the external device and writing any display information into the storage circuit during the first non-writing period of the first display period.

An embodiment of the invention provides a display device including a display panel, an external device, a storage circuit and a display driver device. The external device is configured to output display information of an animated image. The storage circuit is configured to store the display information of the animated image. The display panel is configured to display the animated image according to the display information of the animated image stored in the storage circuit. The display driver device is coupled to the storage circuit. The display driver device is configured to drive the display panel to display the animated image for a first display period under an always on display mode. The first display period includes a first writing period and a first non-writing period after the first writing period. The display driver device is configured to write the display information of the animated image received from the external device into the storage circuit during the first writing period of the first display period. The display driver device is configured to stop receiving the display information from the external device and writing any display information into the storage circuit during the first non-writing period of the first display period.

An embodiment of the invention provides an operating method for a display driver device. The method includes driving a display panel to display an animated image for a display period under an always on display mode according to display information of the animated image stored in a storage circuit, wherein the display period comprises a writing period and a non-writing period after the writing period; and writing the display information of the animated image received from an external device into the storage circuit during the writing period of the first display period and stopping receiving the display information from the external device and writing any display information into the storage circuit during the non-writing period of the display period.

In an embodiment of the invention, the display information of the animated image represents a plurality of images to be sequentially displayed in a same area of the display panel during the first display period.

In an embodiment of the invention, the control circuit is configured to partition the storage circuit into a plurality of regions and store the images respectively into the regions during the first writing period.

In an embodiment of the invention, the control circuit is configured to read the display information stored in the regions of the storage circuit sequentially and drive the display panel to display the animated image by sequentially displaying the images read from the regions of the storage circuit.

In an embodiment of the invention, the control circuit is configured to obtain location information of the regions respectively storing the display information of the images and read the display information of each of the images according to the location information.

In an embodiment of the invention, the display information of the animated image written into the storage circuit during the first writing period represents a plurality of images comprising one or more first images to be displayed during one or more display frames corresponding to the first writing period.

In an embodiment of the invention, the display information of the animated image written into the storage circuit during the first writing period represents a plurality of images comprising one or more second images to be displayed during one or more display frames corresponding to the first non-writing period.

In an embodiment of the invention, the animated image is a first part image of a whole image displayed on the display panel.

In an embodiment of the invention, the driver circuit is further configured drive the display panel to display a first static image during the first display period and display a second static image in a same area of the display panel where the first static image is displayed during a second display period after the first display period under the always on display mode. Each of the first static image and the second static image is a second part image of the whole image displayed on the display panel.

In an embodiment of the invention, the control circuit is further configured to write display information of the first static image received from the external device into the storage circuit during the first writing period of the first display period. The second display period includes a second writing period and a second non-writing period after the second writing period. The control circuit is further configured to update the storage circuit with display information of the second static image received from the external device during the second writing period of the second display period.

In an embodiment of the invention, the control circuit is configured to partition the storage circuit into a plurality of first regions and a second region. The control circuit is configured to write a plurality of images represented by the display information of the animated image respectively into the first regions and write the display information of the first static image into the second region during the first writing period of the first display period.

In an embodiment of the invention, each of the first and second static images represents clock information. The display driver device further includes a real time clock circuit configured to generate each of the first and second static images.

In an embodiment of the invention, the driver circuit is configured to drive the display panel to display the animated image for the second display period. The control circuit is configured to write the display information of the animated image received from the external device into the storage circuit during the second writing period of the second display period and stop receiving the display information from the external device and writing any display information into the storage circuit during the second non-writing period of the second display period.

In an embodiment of the invention, the driver circuit is configured to drive the display panel to constantly display a static background image.

In an embodiment of the invention, the control circuit is configured not to write display information of the static background image during the first writing period of the first display period.

In an embodiment of the invention, the control circuit is further configured to generate display information indicating the static background image.

In an embodiment of the invention, the control circuit is configured to receive complete display information indicating a merged frame image constructed by the plurality of images from the external device and update the storage circuit by a single time according to the complete display information.

In an embodiment of the invention, the control circuit is configured to receive a plurality of different partial display information respectively indicating the plurality of images from the external device and partially update the storage circuit by multiple times respectively according to the different partial display information.

In an embodiment of the invention, the driver circuit is configured to drive the display panel to display the animated image when the external device is in an idle mode or a sleep mode.

In an embodiment of the invention, the storage circuit is a frame buffer disposed within the display driver device.

In an embodiment of the invention, the control circuit is configured to access the storage circuit according to configuration information. The configuration information includes at least one of following information: number information indicating a total number of the images of the animation image, timing setting information for reading each of the images of the animation image, and size or address information of the images of the animation image within the storage circuit.

In an embodiment of the invention, the control circuit is configured to determine whether to read the display information of the animation image from the storage circuit according to information indicating a starting address for displaying the animation image.

In an embodiment of the invention, the control circuit is configured to write the display information of the animation image in at least one dedicated space for storing display information representing images to be displayed under the always on display mode.

In an embodiment of the invention, the control circuit is configured to write the display information of the animation image in at least one shared space for storing display information representing images to be displayed under the always on display mode and a normal display mode.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 illustrates a block diagram of regions of the storage circuit according to an embodiment of the invention.

DESCRIPTION OF THE EMBODIMENTS

Figure 1:
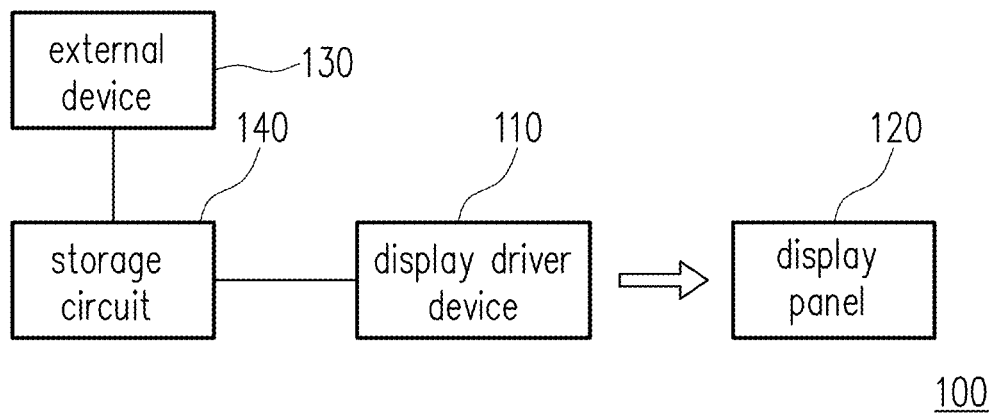
FIG. 1 illustrates a block diagram of a display device according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments are provided below to describe the disclosure in detail, though the disclosure is not limited to the provided embodiments, and the provided embodiments can be suitably combined. The term "coupling/coupled" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

In some embodiments, display information of images for constructing an animation image to be displayed during a non-writing period can be stored in a storage circuit by a display driver device in advance during a writing period prior to the non-writing period. The display driver device can therefore drive a display panel to display the animation image during the non-writing period according to the displayed information which has been stored in the storage circuit during the non-writing period, even though during the non-writing period, the display driver device stops receiving the display information of the animation image from an external device and stops writing the display information of the animation image into the storage circuit.

In some embodiments, during a first period, a display driver device can receive display information of an animation image from an external device and write or store the received display information into a storage circuit. The display driver device may use a first part of the received display information to drive a display panel during the first period. During a second period after the first period, the display driver device can stop receiving display information of the animation image from the external device. The display driver device can further stop writing the storage circuit. The display driver device may use a second part of the received display information to drive the display panel. During the second period, the first part of the received and stored display information can be the same as or different from the second part of the received and stored display information.

Figure 2:
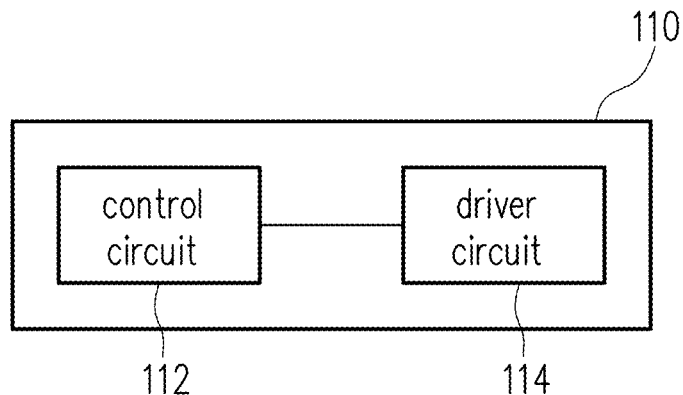
FIG. 2 illustrates a block diagram of a display driver device depicted in FIG. 1.

FIG. 1 illustrates a block diagram of a display device according to an embodiment of the invention. FIG. 2 illustrates a block diagram of a display driver device depicted in FIG. 1. Referring to FIG. 1 and FIG. 2, the display device 100 of the present embodiment includes a display driver device 110 and a display panel 120. The display device may further include at least one of an external device 130 and a storage circuit 140. The external device 130 is configured to output the display information of the animated image. The storage circuit 140 is configured to store the display information of the animated image. The display driver device 110 can be configured to drive the display panel 120 to display an animated image for a display period (a first display period) under an always on display (AOD) mode. The AOD mode is a display device feature that shows limited information while the display device 100 is asleep or idle. The display device 100 with the AOD mode enabled may keep a limited portion of the display panel 120 on to show small images, for example, during a sleep mode or an idle mode.

To be specific, the display driver device 110 can include a driver circuit 114 and a control circuit 112. The control circuit 112 is coupled to the external device 130 and the storage circuit 140. In the present embodiment, the display period can include a writing period (a first writing period) and a non-writing period (a first writing period) after the writing period. The control circuit 112 can receive display information from the external device 130 and writes the display information of the animated image into the storage circuit 140 during the writing period of the display period. The display information of the animated image can represent a plurality of images to be sequentially displayed in the same area of the display panel 120 during the display period. The control circuit 112 can stop receiving the display information from the external device 130 and stop writing any display information into the storage circuit 140 during the non-writing period of the display period.

With the configuration, the driver circuit 114 can drive the display panel 120 to display the animated image for a whole time or a long time of the display period under the AOD mode. The animated image can be displayed without any display information being continuously written into the storage circuit 140 during the non-writing period. That is to say, the driver circuit 114 can drive the display panel 120 to continuously display the animated image even during the non-writing period in which the control circuit 112 stops receiving the display information from the external device 130 and stops writing any display information into the storage circuit 140, or in which the external device 130 is in an idle mode or a sleep mode or any operating mode saving more power compared to the condition or the writing period in which the external device 130 has to transmit display information and thus consumes more power.

In some implementations, the external device 130 can be maintained in the same operating mode during each of the writing period and the non-writing period. In some other implementations, during the non-writing period of the display period, the external device 130 can be further set to be in an idle mode so as to save power. That is, the external device 130 can be set in a non-idle mode/a non-sleep mode during the writing period but switched to the idle or sleep mode during the non-writing period because it can stop transmitting display information to the display driver device 110 during the non-writing period.

The external device 130 is configured to output the display information of the animated image. The external device 130 may be an application processor (AP) of a smartphone in the present embodiment, but the invention is not limited thereto. In an embodiment, the external device 130 may include a storage device disposed outside of the display driver device 110. The storage device is a volatile memory or a non-volatile memory, e.g. DRAM or flash memory. For this case, the display information of the animated image is stored in the storage device, and the control circuit 112 outputs a control signal to the storage device to access the display information of the animated image and writes the display information into the storage circuit 140 during the writing period.

Figure 3:
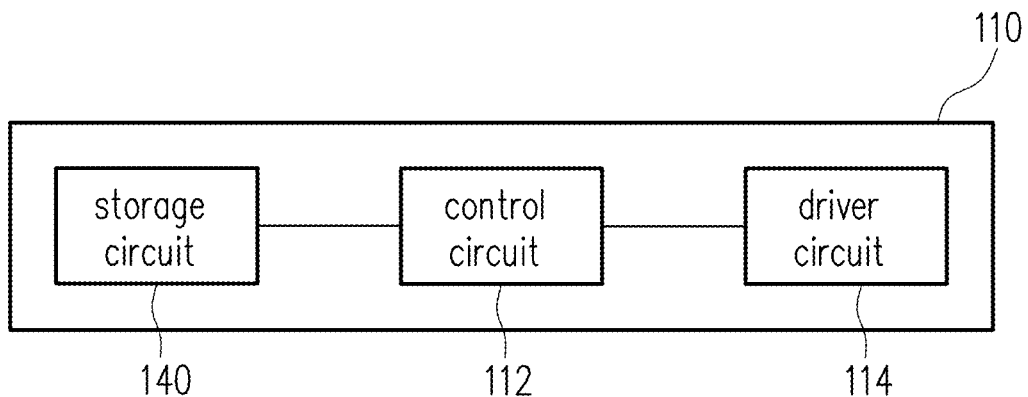
FIG. 3 illustrates a block diagram of a display driver device according to an embodiment of the invention.

The storage circuit 140 is configured to store the display information of the animated image. The storage circuit 140 may be a frame buffer disposed outside of the display driver device 110 in the present embodiment, but the invention is not limited thereto. The storage device is a volatile memory or a non-volatile memory, e.g. DRAM or flash memory. In an embodiment, the storage circuit 140 may be a frame buffer disposed within the display driver device 110. FIG. 3 illustrates a block diagram of a display driver device according to an embodiment of the invention. Referring to FIG. 3, the storage circuit 140 is a frame buffer disposed within the display driver device 110.

Enough teaching, suggestion, and implementation illustration for the control circuit 112, the driver circuit 114 and the display panel 120 and embodiments thereof may be obtained with reference to common knowledge in the related art, which is not repeated hereinafter.

FIG. 4 illustrates a block diagram of regions of the storage circuit according to an embodiment of the invention. Referring to FIG. 4, the control circuit 112 can partition the storage circuit 140 into a plurality of regions and stores the images of the animation image respectively into the regions during the writing period. The storage circuit 140 may be partitioned according to size and/or number of the images of the animation image. For example, the control circuit 112 may partition the storage circuit 140 into a plurality of regions A0 to Ai, B0 to Bj and C0 to Ck, where i, j and k are positive integers. In the present embodiment, blocks W1H1, W2H2 and W3H3 respectively include the regions A0 to Ai, B0 to Bj and C0 to Ck. The regions included in the same block have the same size. The regions included in different blocks have different sizes, but the invention is not limited thereto. The control circuit 112 stores the images respectively into the regions during the writing period. The partitioned regions in the storage circuit 140 is not limited to store images displayed under a normal display mode with specified resolution. The partitioned regions in the storage circuit 140 may also be configured to store the images of the animation image displayed under the always on display mode with a resolution that is larger than, small than or equal to the specified resolution.

Figure 14:
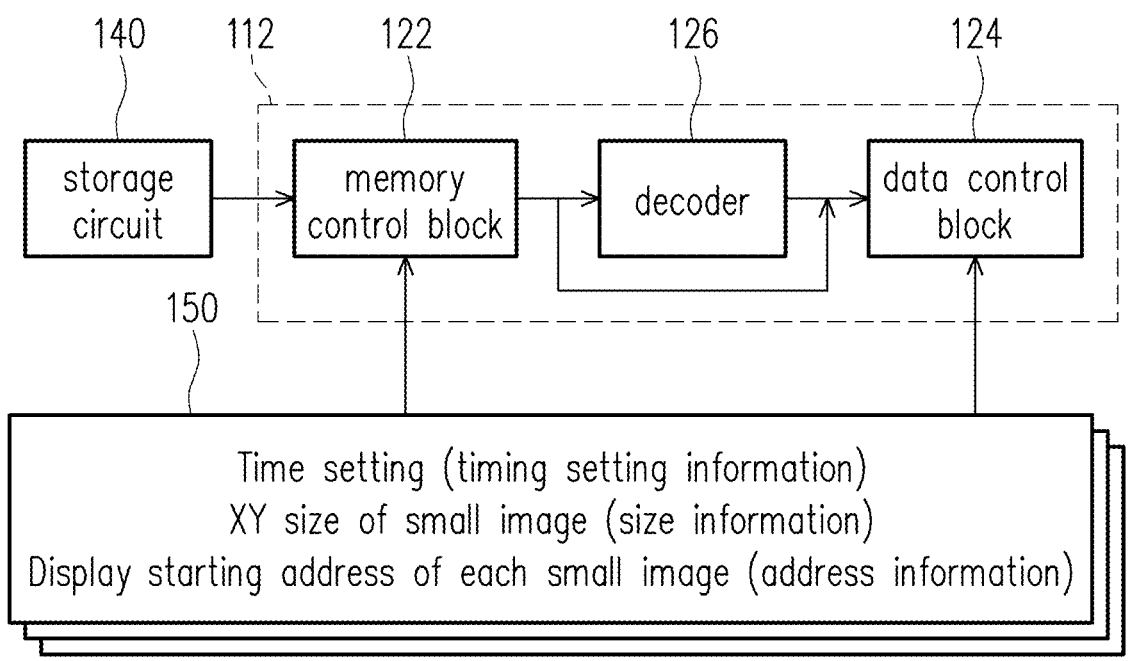
FIG. 14 illustrates a block diagram of a display driver device according to another embodiment of the invention.

The control circuit 112 accesses the storage circuit 140 according to configuration information 150 as illustrated in FIG. 14, for example. The configuration information 150 includes at least one of following information: number information indicating a total number of the images of the animation image, timing setting information for reading each of the images of the animation image, and size or address information of the images of the animation image within the storage circuit, but the invention is not limited thereto.

In an embodiment, the control circuit 112 is configured to write the display information of the animation image in at least one dedicated space for storing display information representing images to be displayed under the always on display mode. In another embodiment, the control circuit 112 is configured to write the display information of the animation image in at least one shared space for storing display information representing images to be displayed under the always on display mode and the normal display mode. In another embodiment, the control circuit 112 is configured to write the display information of the animation image in at least one space for storing display information representing images to be displayed under the always on display mode and the normal display mode, where the space for storing display information representing images to be displayed under the always on display mode is separate from the space for storing display information representing images to be displayed under the normal display mode.

Figure 5A:
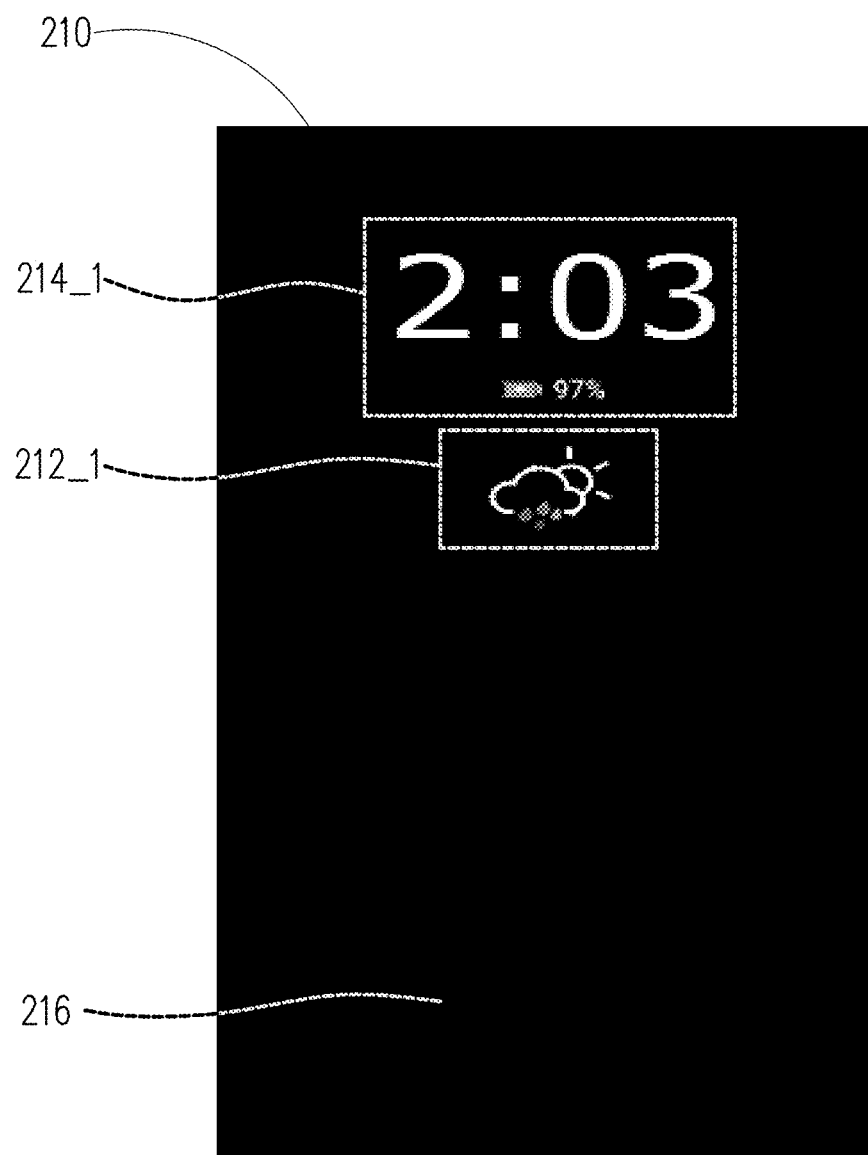
FIG. 5A illustrates a schematic diagram of an animation image displayed on the display panel according to an embodiment of the invention.
Figure 5B:
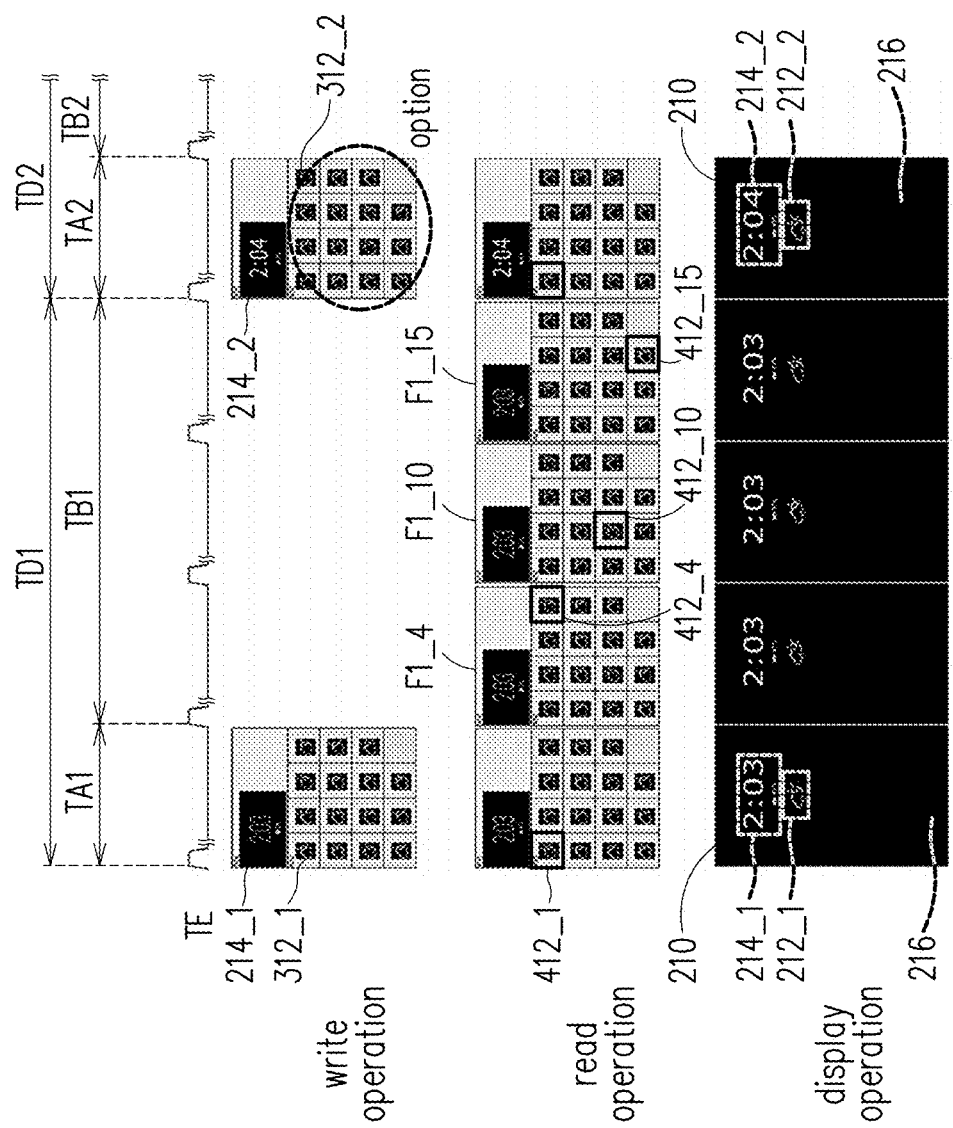
FIG. 5B is a schematic diagram illustrating a data accessing operation of the storage circuit for displaying the animation image on the display panel according to an embodiment of the invention.

FIG. 5A illustrates a schematic diagram of an animation image displayed on the display panel according to an embodiment of the invention. FIG. 5B is a schematic diagram illustrating a data accessing operation of the storage circuit for displaying the animation image on the display panel according to an embodiment of the invention. Referring to FIG. 5A and FIG. 5B, the third image line of FIG. 5B illustrates a display operation of the display panel 120. The display panel 120 displays a plurality of images 210 during a display period. For example, the whole image 210 includes an animated image 212_1, a first static image 214_1 and a background image 216 during a first display period TD1 as illustrated in FIG. 5A. The signal TE indicates whether the display panel 120 finishes the display of an image. It is noted that the first static image 214_1 can be an animated image but remains static during at least the first display period TD1.

To be specific, the driver circuit 114 drives the display panel 120 to display the animated image 212_1 for the first display period TD1 and display another animated image 212_2 for a second display period TD2 after the first display period TD1 under the AOD mode. The animated image 212_1 and the animated image 212_2 may be the same or different. Each of the animated image 212_1 and the animated image 212_2 can be a first part image of the whole image 210 displayed on the display panel 120. That is, the display panel 120 displays the animated image 212_2 in the same area where the animated image 212_1 is displayed, but the invention is not limited thereto. In the present embodiment, the animated image 212_1 and the animated image 212_2 are both the same weather information and repeatedly displayed during the first display period TD1 and the second display period TD2, but the invention is not limited thereto. In an embodiment, the animated image 212_1 and the animated image 212_2 may be different information and not displayed repeatedly. It is noted that in some alternative embodiments, the control circuit 112 may be configured not to write display information of the plurality of images 312_1 into the storage circuit 140 during the second display period TD2 since the same display information written during the first display period TD1 can be read out again during the second display period TD2 for displaying the images 312_1. The driver circuit 114 further drives the display panel 120 to display a first static image 214_1 during the first display period TD1 and display a second static image 214_2 during the second display period TD2 under the AOD mode. The display panel 120 displays the second static image 214_2 in the same area where the first static image 214_1 is displayed, but the invention is not limited thereto. Each of the first static image 214_1 and the second static image 214_2 is a second part image of the whole image 210 displayed on the display panel 120.

In the present embodiment, each of the first static image 214_1 and the second static image 214_2 represents clock information. For example, the first display period TD1 may be set as one minute. The first static image 214_1 represents clock information of "2:03" and is a static image during the first display period TD1. Similarly, the second display period TD2 may also be set as one minute, and the second static image 214_2 represents clock information of "2:04". The second static image 214_2 is a static image displayed during the second display period TD2. Although the first static image 214_1 and the second static image 214_2 are respectively static images during the first display period TD1 and the second display period TD2, the clock information represented by the first static image 214_1 and the second static image 214_2 may change under the AOD mode.

The driver circuit 114 further drives the display panel 120 to constantly display a background image 216 during the first display period TD1 and the second display period TD2. In the present embodiment, the background image 216 is a static black image, but the invention is not limited thereto. The control circuit 112 may generate display information indicating the static background image 216. Therefore, the control circuit 112 may include a memory control block 122 for managing the storage circuit 140 and a data control block 124 for generating display information as illustrated in FIG. 14, for example. Alternatively, the display information indicating the static background image 216 may be pre-stored in the storage circuit 140.

The first image line of FIG. 5B illustrates a write operation of the storage circuit 140. The write operation of the storage circuit 140 may be controlled by the control circuit 112. In an embodiment, the external device 130 may directly write display information into the storage circuit 140 and controlled by the control circuit 112.

The first display period TD1 and the second display period TD2 respectively include writing periods TA1 and TA2 and non-writing periods TB1 and TB2 after the writing periods TA1 and TA2. Taking the first display period TD1 for example, the control circuit 112 writes the display information of the animated image 212_1 and the first static image 214_1 received from the external device 130 into the storage circuit 140 during the first writing period TA1. The display information of the animated image 212_1 represents a plurality of images 312_1 to be sequentially displayed in the same area of the display panel 120 during the first display period TD1. The control circuit 112 can partition the storage circuit 140 into the plurality of regions A0 to Ai (second regions), B0 to Bj (first regions) and C0 to Ck as illustrated in FIG. 4. The control circuit 112 writes the plurality of images 312_1 respectively into the block W2H2 including the first regions B0 to Bj and writes the display information of the first static image 214_1 into the block W1H1 including the second regions A0 to Ai during the first writing period TA1. Next, the control circuit 112 stops receiving the display information from the external device 130 and writing any display information into the storage circuit 140 during the first non-writing period TB1 of the first display period TD1.

Similarly, the control circuit 112 writes the display information of the animated image 214_2 received from the external device 130 into the storage circuit 140 during the second writing period TA2 of the second display period TD2. For example, the control circuit 112 stores the plurality of images 312_2 respectively into the block W2H2 including the first regions B0 to Bj during the second writing period TA2. Since the animated image 212_1 and the animated image 212_2 are both the same weather information and repeatedly displayed during the first display period TD1 and the second display period TD2, the write operation for the plurality of images 312_2 is option. In addition, the control circuit 112 further updates the block W1H1 including the second regions A0 to Ai of the storage circuit 140 with display information of the second static image 214_2 received from the external device 130 during the second writing period TA2 of the second display period TD2. Next, the control circuit 112 stops receiving the display information from the external device 130 and writing any display information into the storage circuit 140 during the second non-writing period TB2 of the second display period TD2.

Furthermore, since the driver circuit 114 drives the display panel 120 to constantly display the static background image 216, the control circuit cannot write display information of the static background image 216 during the first writing period TA1 and the second writing period TA2. The control circuit 112 may generate display information indicating the static background image 216. Alternatively, the display information indicating the static background image 216 may be pre-stored in the storage circuit 140.

The second image line of FIG. 5B illustrates a read operation of the storage circuit 140, and the read operation of the storage circuit 140 may be controlled by the control circuit 112. The control circuit 112 reads the display information stored in the regions B0 to Bj of the storage circuit 140 sequentially. For example, the control circuit 112 obtain location information of the regions B0 to Bj respectively storing the display information of the images 312_1 and 312_2, and reads the display information of each of the images 312_1 and 312_2 according to the location information. The control circuit 112 controls the driver circuit 114 to drive the display panel 120 to display the animated image 212_1 and 212_2 by sequentially displaying the images 312_1 and 312_2 read from the regions B0 to Bj of the storage circuit 140.

To be specific, the display information of the animated image 212_1 written into the storage circuit 140 during the first writing period TA1 represents a plurality of images comprising one or more first images 412_1 to be displayed during the first writing period TA1. Additionally or alternatively, the display information of the animated image 212_1 written into the storage circuit 140 during the first writing period TA1 represents a plurality of images comprising one or more second images 412_2-412_15 to be displayed during the first non-writing period TB1. The control circuit 112 reads the display information representing the one or more first images 412_1 from the storage circuit 140 to be displayed during a display frame period corresponding to the first writing period TA1. The control circuit 112 reads the display information representing the one or more second images 412_2-412_15 from the storage circuit 140 to be displayed during the first non-writing periods TB1, where only second images 412_4, 412_10 and 412_15 are shown for example and the rest second images are omitted. The driver circuit 114 drives the display panel 120 to display the one or more first images 412_1 during the display frame corresponding to the first writing period TA1. The driver circuit 114 drives the display panel 120 to display the one or more second images 412_2-412_15 during one or more display frames corresponding to the non-writing period TB1.

For example, one or more first images 412_1 are displayed during one or more display frames corresponding to the first writing period TA1, and one or more second images 412_2-412_15 are respectively displayed during one or more display frames corresponding to the first non-writing period TB1 as illustrated in the second image line of the FIG. 5B. The first non-writing period TB1 correspond to one or more display frames, for example, F1_2-F1_15 (only the display frames F1_4, F1_10 and F1_15 are shown for example and the rest display frames are omitted). Each one of the one or more second images 412_2-412_15 is displayed during a corresponding one of the one or more display frames F1_2-F1_15. For example, the second image 412_4 is read and displayed during the display frame F1_4, and the second images 412_10 and 412_15 are respectively read and displayed during the display frames F1_10 and F1_15.

It is noted that the one or more first images and the one or more second images are illustrated to be stored in different locations of the storage circuit. In some implementations, one or more images among either or both of the first images and the second images can be displayed repeatedly according to design requirements. For example, the same image stored in the same location can be displayed for different display frames during either or both of the writing period and the non-writing period. In more details, the display driver device may use a first part of the display information received during the writing period to drive the display panel during a first period (e.g., the writing period, or a first part of the writing period, or a first part of the non-wring period). The display driver device may use a second part of the received display information to drive the display panel. During a second period (e.g., the non-writing period when the first period is the writing period, or a second part of the writing period when the first period is the first part of the writing period, or a part of the non-writing period when the first period is the first part of the non-writing period), wherein the first part can be the same or different from the second part.

In some embodiments, the animated image is displayed in the display frames corresponding to the writing period and the non-writing period. That is, the animated image is constructed by one or more first images and one or more second images. The one or more first images are displayed in the display frames corresponding to the writing period. The one or more second images are displayed in the display frames corresponding to the non-writing period.

In some embodiments, the animated image is only displayed during the non-writing period. That is, the animated image is constructed by one or more images, and the one or more images are displayed in the display frames corresponding to the non-writing period.

Figure 6:
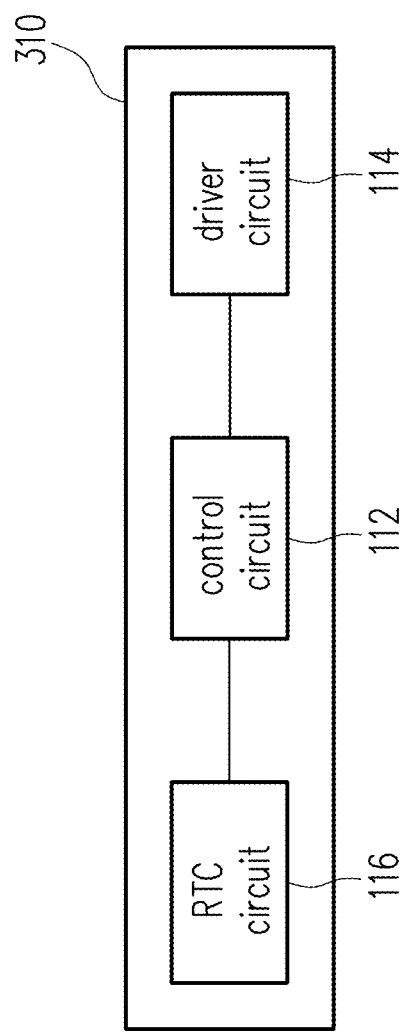
FIG. 6 illustrates a block diagram of a display driver device according to another embodiment of the invention.
Figure 7:
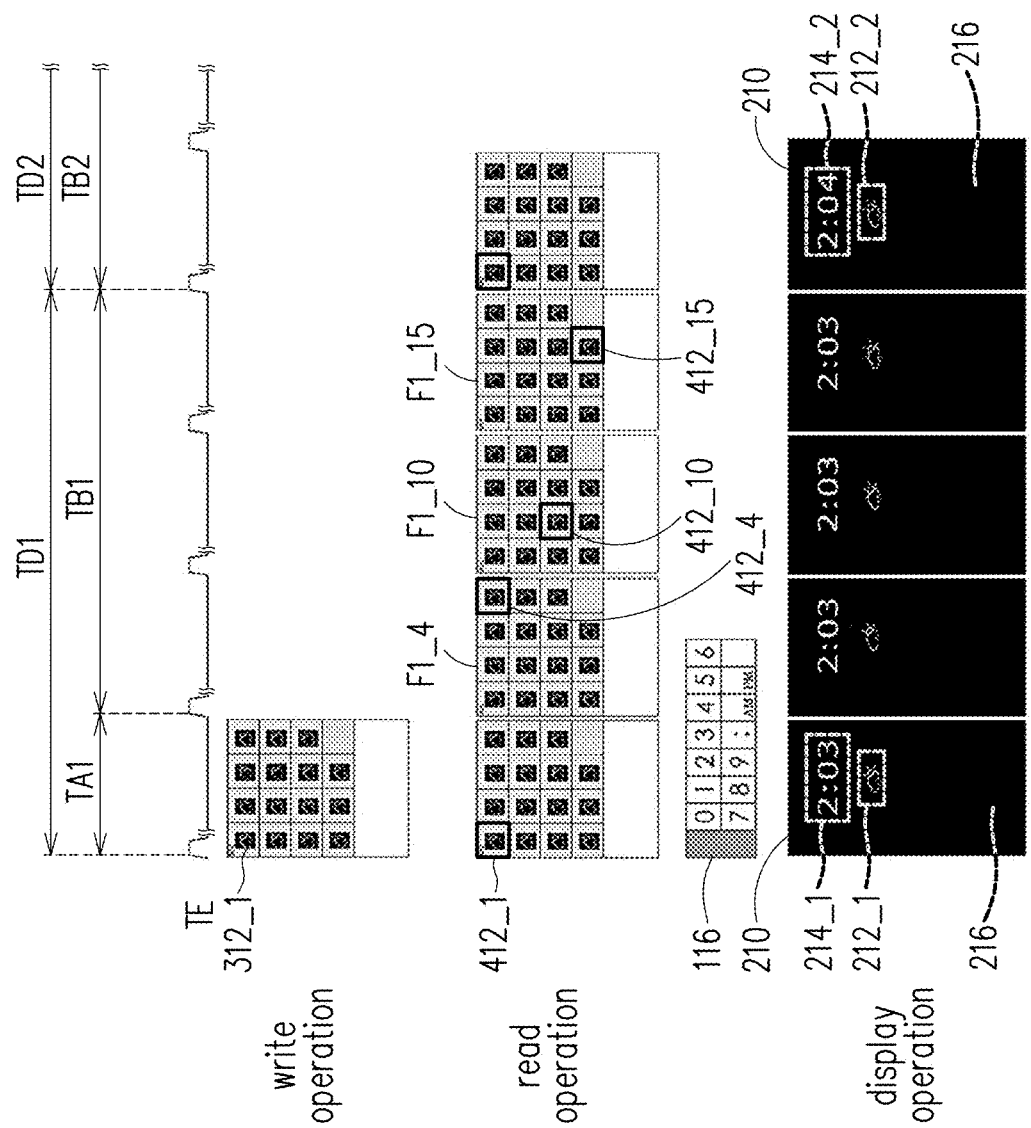
FIG. 7 is a schematic diagram illustrating a data accessing operation of the storage circuit for displaying the animation image on the display panel according to another embodiment of the invention.

FIG. 6 illustrates a block diagram of a display driver device according to another embodiment of the invention. FIG. 7 is a schematic diagram illustrating a data accessing operation of the storage circuit for displaying the animation image on the display panel according to another embodiment of the invention. Referring to FIG. 6 and FIG. 7, the display driver device 310 further includes a real time clock (RTC) circuit 116. The RTC circuit 116 is configured to generate a plurality of images indicating clock information, including each of the first and second static images 214_1 and 214_2. Each of the first and second static images 214_1 and 214_2 represents the clock information in the present embodiment. Therefore, the control circuit 112 cannot need to write display information of the first static image 214_1 into the storage circuit 140 during the first writing period TA1 of the first display period TD1. The control circuit 112 cannot need to write display information of the second static image 214_2 into the storage circuit 140 during the second display period TD2, either.

In addition, the control circuit 112 may be configured not to write display information of the plurality of images 312_1 into the storage circuit 140 during the second display period TD2 since the same display information written during the first display period TD1 can be read out again during the second display period TD2 for displaying the images 312_1. However, the disclosure is not limited thereto. In other words, similar to the embodiments shown in FIG. 5B, the control circuit 112 may be configured to write display information of a plurality of images (which may be different from or the same as the images 312_1) into the storage circuit 140 during the second display period TD2.

The operation of the display driver device 310 described of the embodiment of the invention is sufficiently taught, suggested, and embodied in the embodiments illustrated in FIG. 1 to FIG. 5B, and therefore no further description is provided herein. In addition, the RTC circuit 116 may be implemented by using any RTC circuit structure in the related art. Enough teaching, suggestion, and implementation illustration for the RTC circuit 116 and embodiments thereof may be obtained with reference to common knowledge in the related art, which is not repeated hereinafter.

In the embodiments illustrated in FIG. 1 to FIG. 7, the control circuit 112 may receive a plurality of different partial display information respectively indicating the plurality of images 312_1 or 312_2 as depicted FIG. 5B from the external device 130. In addition, the control circuit 112 can partially update the storage circuit 120 by multiple times respectively according to the different partial display information, but the invention is not limited thereto.

It is noted display information of images to be displayed in the AOD mode may not always be received from the external device 130 and can be generated by an internal circuit within the display driver device 310. Display information of clock information is an example but the disclosure is not limited thereto.

Figure 8A:
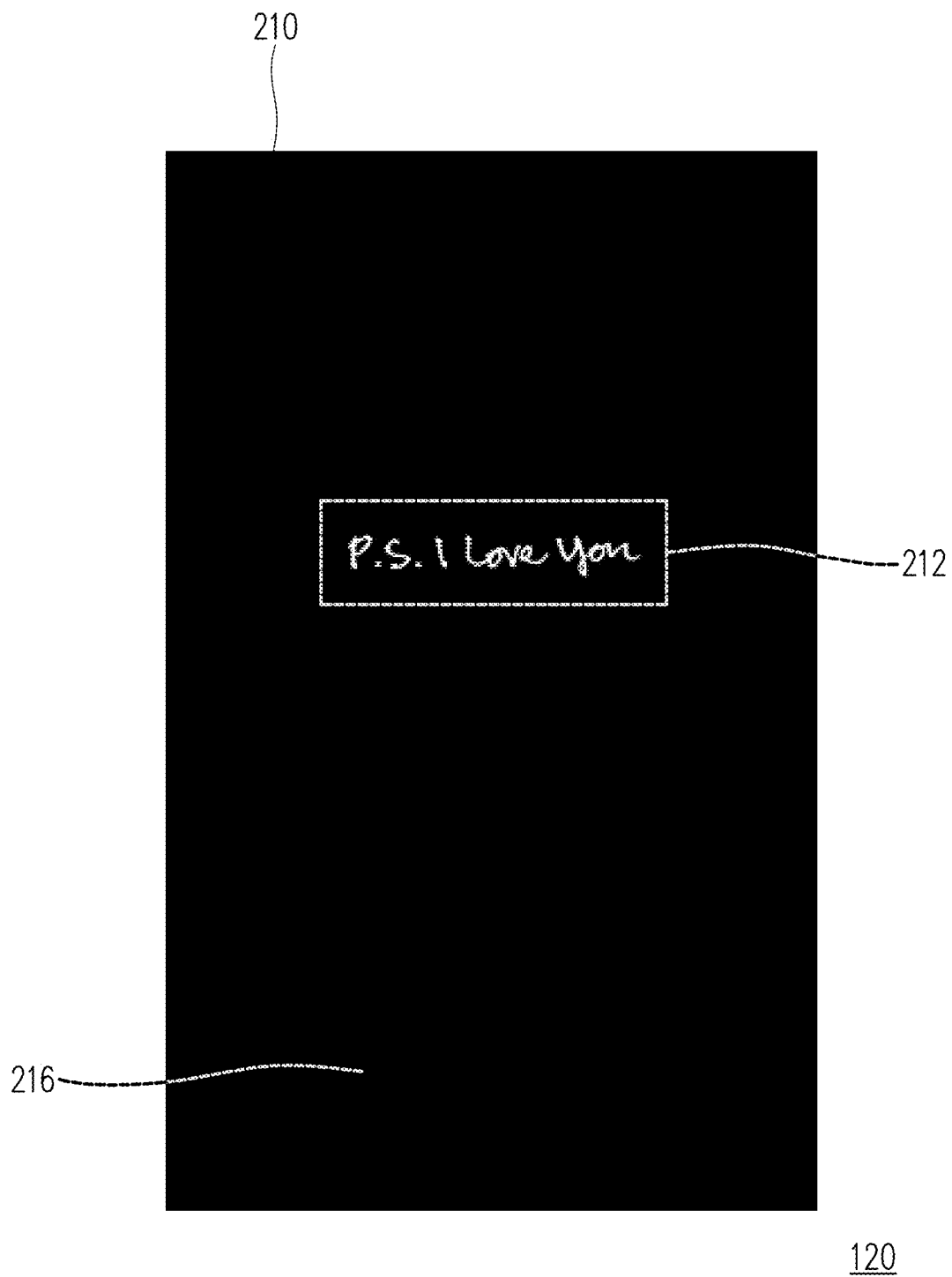
FIG. 8A illustrates a schematic diagram of an animation image displayed on the display panel according to another embodiment of the invention.
Figure 8B:
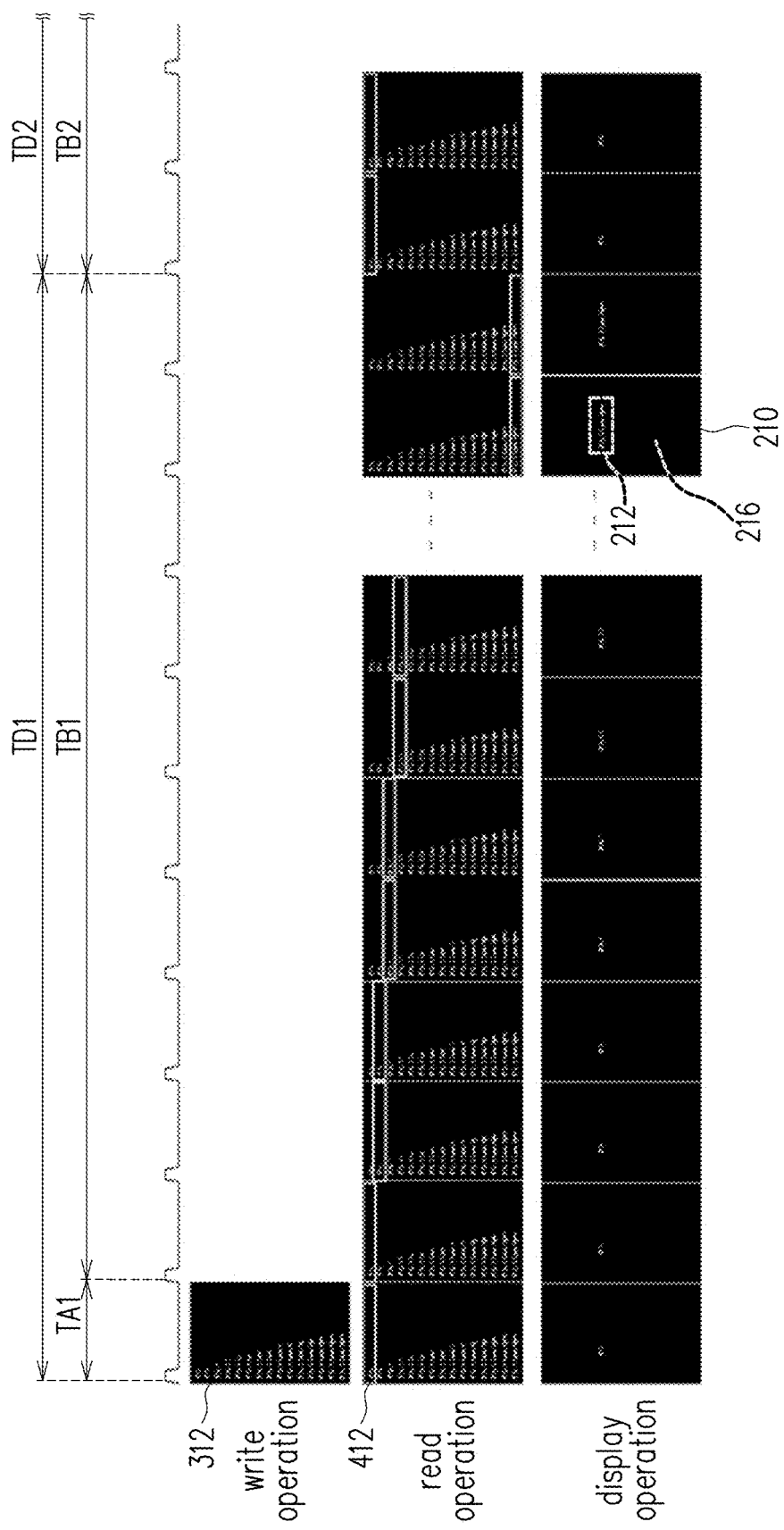
FIG. 8B is a schematic diagram illustrating the storage circuit is updated by a single time according to the complete display information.

FIG. 8A illustrates a schematic diagram of an animation image displayed on the display panel according to another embodiment of the invention. FIG. 8B is a schematic diagram illustrating the storage circuit is updated by a single time according to the complete display information. Referring to FIG. 1, FIG. 2, FIG. 8A and FIG. 8B, the driver circuit 114 drive the display panel 120 to display an animated image 212 for the first display period TD1 and the second display period TD2 under the AOD display mode.

In some implementations, the control circuit 112 can receive complete display information indicating a merged frame image 312 constructed by the plurality of images 412 from the external device 130. The merged frame image 312 constructed by the plurality of images 412 is merged in the external device 130. Therefore, the control circuit 112 updates the storage circuit 140 by a single time according to the complete display information.

In alternative implementations, the control circuit 112 can receive a plurality of different partial display information respectively indicating the plurality of images 412 from the external device 130. This means that the plurality of images 412 are not merged by the external device 130 to a single frame image and instead, they are sequentially transmitted from the external device 130 to the display driver device. The control circuit 112 can then partially update the storage circuit 140 by multiple times respectively according to the different partial display information.

In some implementations, the control circuit 112 may not the write complete display information indicating the merged frame image 312 into the storage circuit 140 during the second display period TD2 since the display panel 120 displays the same animated image 212.

In some other embodiments, the control circuit 112 may still write part or complete display information into the storage circuit 140 during the second display period TD2 to allow the display panel 120 displays an animated image which may be totally or partially the same as or totally different from the merged frame image 312.

Figure 9:
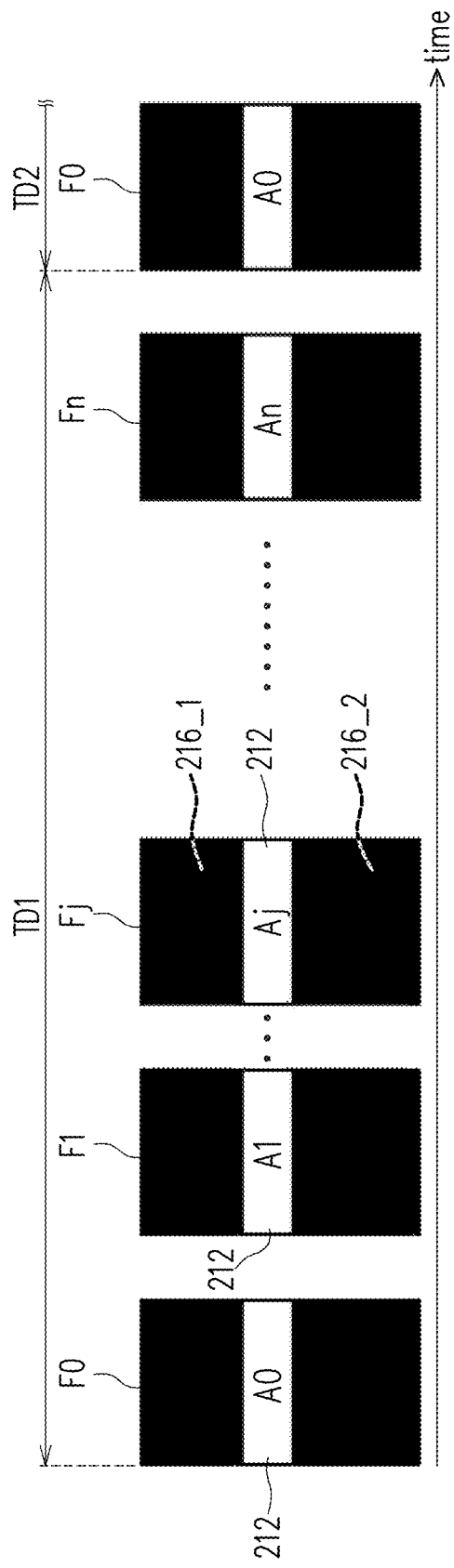
FIG. 9 is a schematic diagram illustrating the display panel displays a plurality of display frames under the AOD mode according to an embodiment of the invention.
Figure 10:
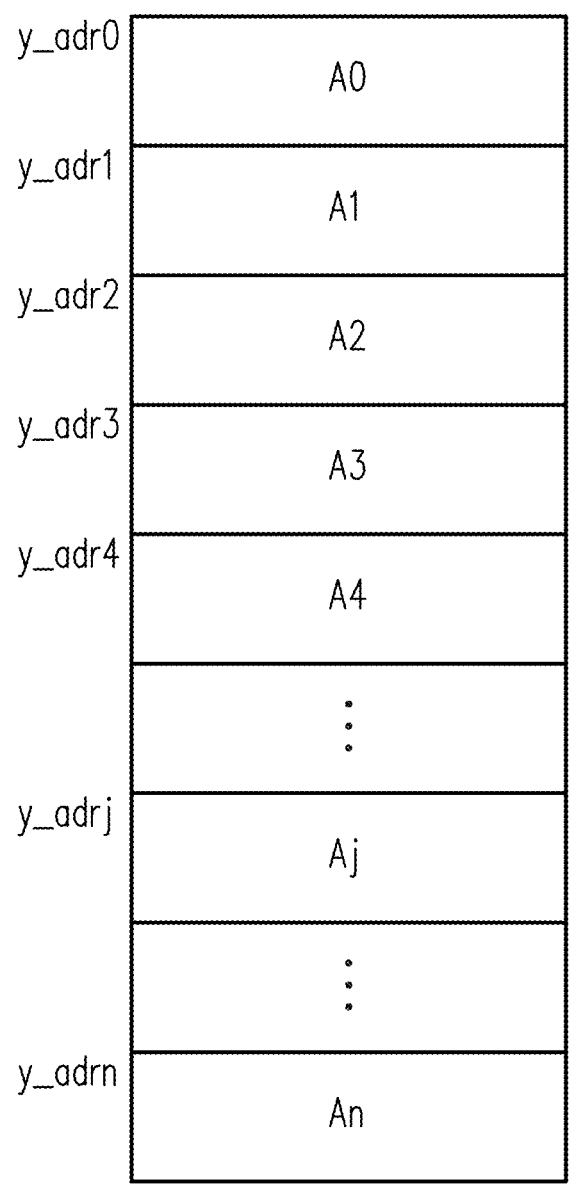
FIG. 10 illustrates a block diagram of regions of the storage circuit according to another embodiment of the invention.
Figure 11:
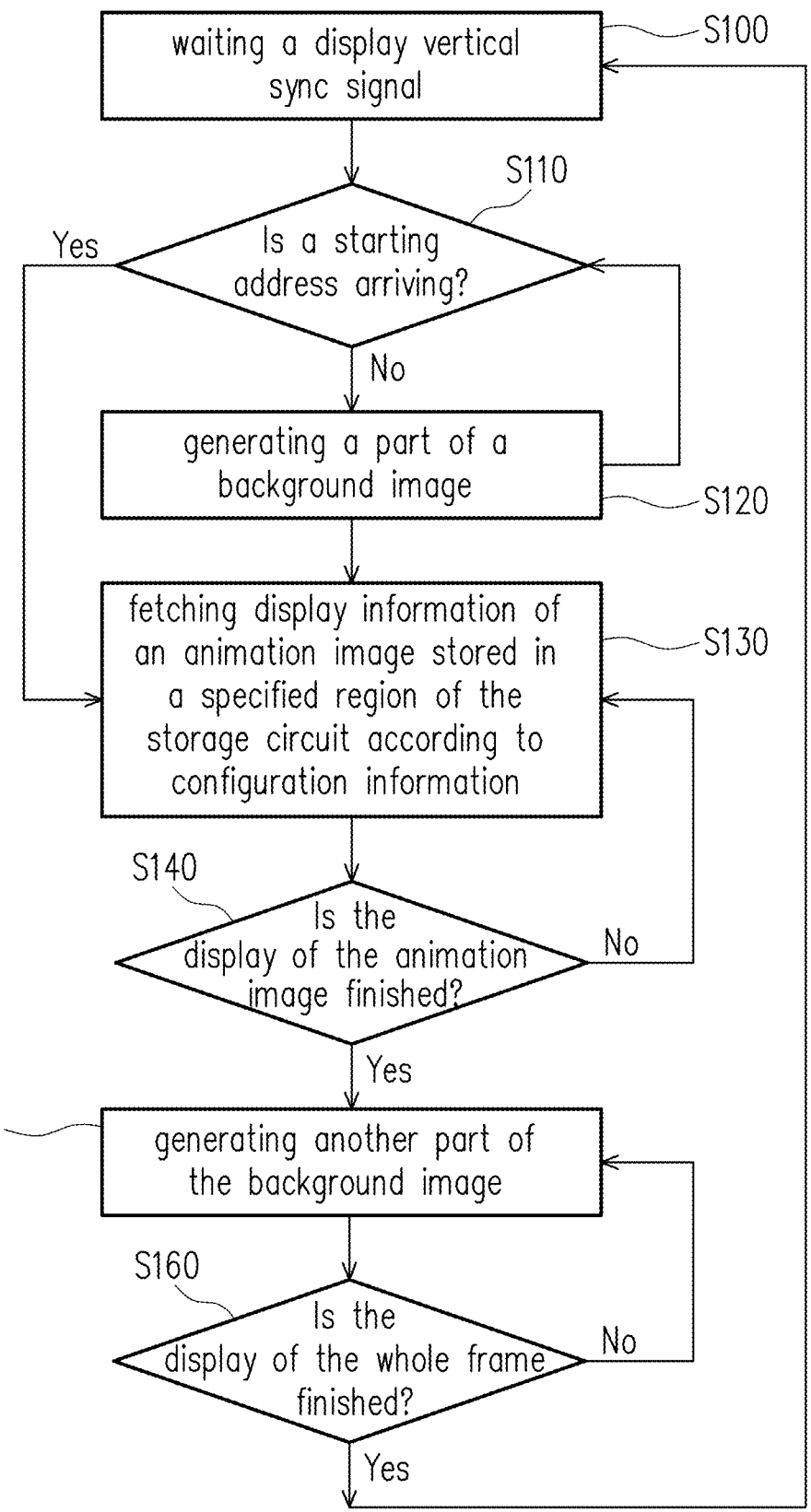
FIG. 11 illustrates a method for display each frame according to an embodiment of the invention.

FIG. 9 is a schematic diagram illustrating the display panel displays a plurality of display frames under the AOD mode according to an embodiment of the invention. FIG. 10 illustrates a block diagram of regions of the storage circuit according to another embodiment of the invention. FIG. 11 illustrates a method for display each frame according to an embodiment of the invention. The method can be performed in each of the frames.

Referring to FIG. 9 to FIG. 11, the control circuit 112 partitions the storage circuit 140 into a plurality of regions such as A0 to An in the present embodiment, where n is a positive integer. The regions A0 to An have respective start addresses y_adr0 to y_adrn. The animated image 212 can be displayed in the same area of the display panel 120 during the first display period TD1 and the second display period TD2. The signs A0 to An marked in each frame represent the display information of the animated image 212 stored in the regions A0 to An of the storage circuit 140.

Taking the frame Fj including the animated image 212 that the display information is stored in the region Aj for example, the driver circuit 114 can wait a display vertical sync signal to drive the display panel 120 to display the frame Fj in step S100. In step S110, the control circuit 112 can determine whether to read the display information of the animation image from the storage circuit 140 according to information indicating a starting address for displaying the animation image 212. If the starting address does not arrive, the control circuit 112 can generate the background image 216_1 in step S120. If the starting address arrives, the control circuit 112 can start to fetch the display information stored in the region Aj of the storage circuit 140 according to configuration information, e.g. timing setting information for reading each of the images of the animation image and size or address information of the images of the animation image, in step S130.

In step S140, the control circuit 112 determines whether the display of the animation image 212 in the frame Fj is finished. If the display is finished, the control circuit 112 generates the background image 216_2 in step S150. If the display is not finished, the control circuit 112 return to step S130 to continuously fetch the display information stored in the region Aj of the storage circuit 140. In step S160, the control circuit 112 determines whether the display of the whole the frame Fj is finished. If the display is finished, the flow returns to step S100, and the driver circuit 114 waits the display vertical sync signal to drive the display panel 120 to display next frame. If the display is not finished, the control circuit 112 return to step S150 to continuously generate the background image 216_2.

Figure 12:
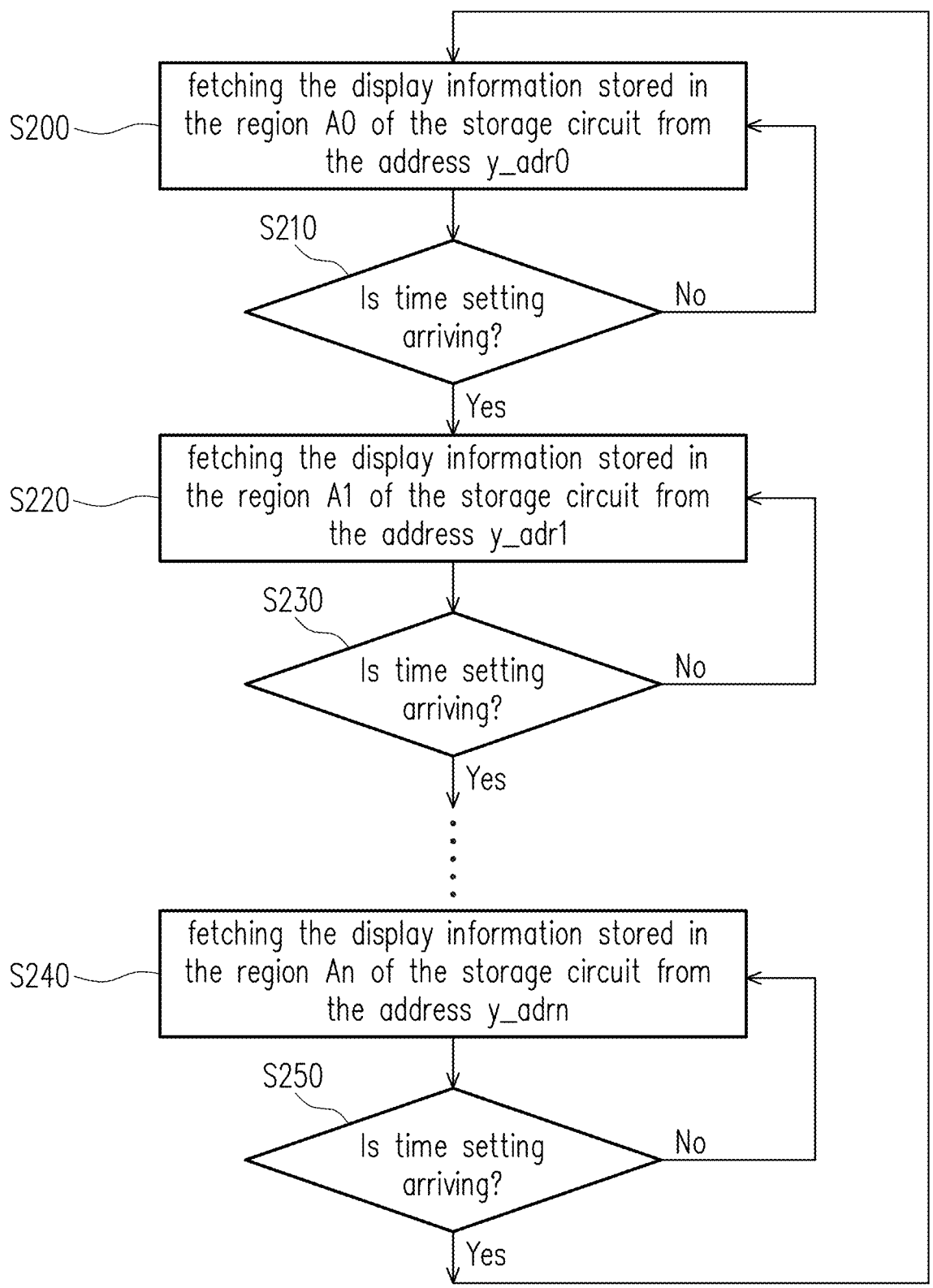
FIG. 12 illustrates a method for display a plurality of frames according to an embodiment of the invention.

FIG. 12 illustrates a method for display a plurality of frames according to an embodiment of the invention. The method can be performed between the frames. Referring to FIG. 9, FIG. 10 and FIG. 12, in step S200, the control circuit 112 fetches the display information stored in the region A0 of the storage circuit 140 from the address y_adr0 for displaying the animation image 212 of the frame F0 during the first display period TD1.

Next, the control circuit 112 determines whether timing setting for displaying next frame arrives in step S210. If the timing setting for displaying the next frame does not arrive, the control circuit 112 return to step S200 to continuously fetch the display information stored in the region A0 of the storage circuit 140. If the timing setting for displaying the next frame arrives, the control circuit 112 goes to step S220. In step S220, the control circuit 112 fetches the display information stored in the region A1 of the storage circuit 140 from the address y_adr1 for displaying the animation image 212 of the frame F1, where the address y_adr1 is equal to the summation of the address y_adr0 and Y size.

Thereafter, the control circuit 112 can determine whether timing setting for displaying next frame arrives in step S230. If the timing setting for displaying the next frame does not arrive, the control circuit 112 can return to step S220 to continuously fetch the display information stored in the region A1 of the storage circuit 140. If the timing setting for displaying the next frame arrives, the control circuit 112 can fetch the display information stored in the next region of the storage circuit 140 from the corresponding address for displaying the animation image 212 of the next frame.

In step S240, the control circuit 112 can fetch the display information stored in the region An of the storage circuit 140 from the address y_adrn for displaying the animation image 212 of the frame Fn, where the address y_adrn is equal to the summation of the address y_adr(n−1) and Y size. In step S250, the control circuit 112 determines whether timing setting for displaying next frame in the second display period TD2 arrives. If the timing setting for displaying the next frame does not arrive, the control circuit 112 can return to step S240 to continuously fetch the display information stored in the region An of the storage circuit 140. If the timing setting for displaying the next frame arrives, the control circuit 112 can go to step S200. In step S200, the control circuit 112 fetches the display information stored in the region A0 of the storage circuit 140 from the address y_adr0 again for displaying the animation image 212 of the frame F0 during the second display period TD2.

Figure 13:
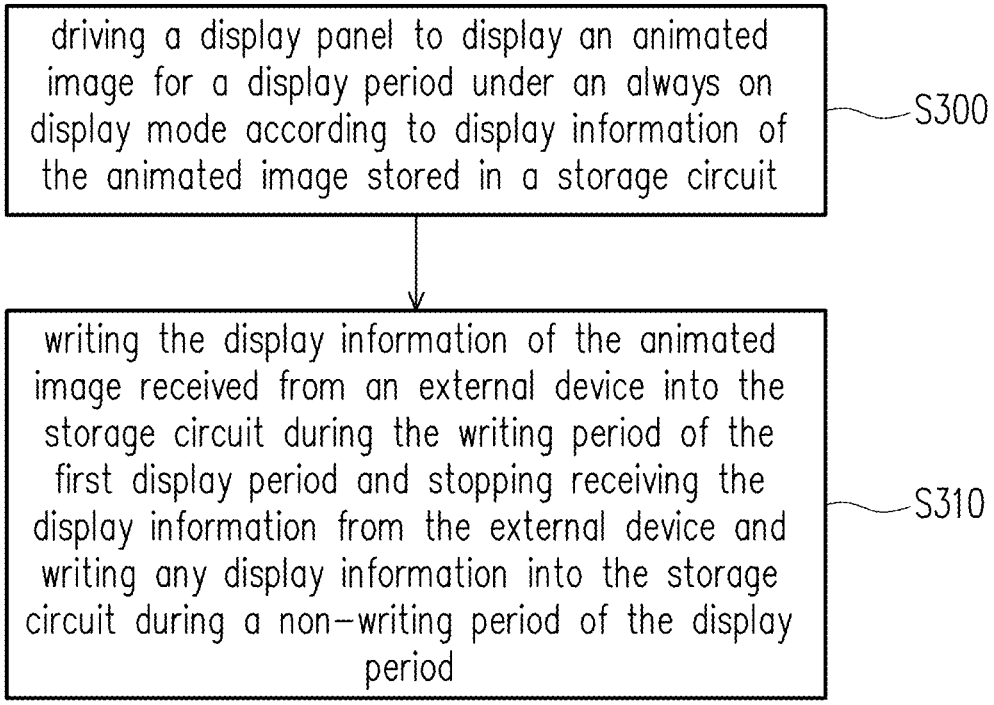
FIG. 13 is a flowchart illustrating steps in an operating method for a display driver device according to an embodiment of the invention.

FIG. 13 is a flowchart illustrating steps in an operating method for a display driver device according to an embodiment of the invention. Referring to FIG. 1, FIG. 2 and FIG. 13, the operating method of the embodiment is at least adapted to the display driver device 110 of FIG. 2, but the invention is not limited thereto. Taking the display driver device 110 of FIG. 2 for example, in step S300, the driver circuit 114 drives the display panel 120 to display an animated image for a display period under an always on display mode according to display information of the animated image stored in the storage circuit 140. In step S310, the control circuit 112 writes the display information of the animated image received from the external device 130 into the storage circuit 140 during the writing period of the first display period, and the control circuit 112 stops receiving the display information from the external device and writing any display information into the storage circuit during the non-writing period of the display period.

In addition, sufficient teaching, suggestion, and implementation illustration regarding the operating method of the embodiments of the invention may be obtained from the foregoing embodiments of FIG. 1 to FIG. 13, and thus related description thereof is not repeated hereinafter.

FIG. 14 illustrates a block diagram of a display driver device according to another embodiment of the invention. Referring to FIG. 14, the control circuit 112 accesses the storage circuit 140 according to the configuration information 150. The control circuit 112 includes a memory control block 122, a data control block 124 and a decoder 126. The memory control block 122 is configured to manage the storage circuit 140. The data control block 124 is configured to generate display information. For example, the data control block 124 may generate display information indicating the static background image 216. The decoder 126 is configured to decode the images of the animation image read from the storage circuit 140.

In some implementations, the application processor may be configured not to continuously write the display information of the animated image into the storage circuit during the whole display period. Even for an animation image constructed by different small images to be displayed, the application processor may be configured not to continuously write the display information of the animated image into the storage circuit. That is, the application processor can operate without writing the storage circuit (for example, under the idle mode or the sleep mode) for a long time. Besides, the display driver device can obtain location information of the regions that store the display information to read in the storage circuit, and thus the display driver device may be configured not to read all regions of the storage circuit.

In some embodiments of the invention, the storage circuit can be partitioned into a plurality of regions to store small images of the animation image. For displaying the animation image, the display driver device can select appropriate regions to read small images according to timing setting, size and/or starting address when the timing setting arrives. Therefore, the application processor can operate under the idle mode or the sleep mode for a long time, and the data volume that the display driver device reads from the storage circuit may be reduced. The power consumption can be even lower than that of displaying a static image. In addition, for user experience, good visual effect of the animation image can be provided under the AOD mode.

In some embodiments of the invention, the application processor can write a merged frame image into the storage circuit by a single time at predefined intervals and operate under the idle mode or the sleep mode for a long time to reduce power consumption. The display driver device may have a real time clock circuit to generate time information and read less data volume from the storage circuit to display the animation image, such as dynamic weather information.

In some embodiments of the invention, time information is generated by the real time clock circuit to decrease times of waking up the application processor for writing images, such that the power consumption is further reduced. If it is unnecessary to update the weather information, the application processor can write a merged frame image into the storage circuit by a single time and operate under the idle mode or the sleep mode for a long time to reduce power consumption. To display the time information, the real time clock circuit is configured in the display driver device. The time information to be displayed is generated according to time counting and initial time setting.

In some embodiments of the invention, if it is unnecessary to update the time information in one minute but needs to reduce frequency that the application processor wakes up and output images, the merged frame image including the time information can be stored in regions of the storage circuit that are read by hours, but the merged frame image is read every few minutes. As such, the application processor can wake up and write the merged frame image into the storage circuit every few minutes.

In summary, in the embodiments of the invention, the driver circuit can drive a display panel to sequentially display images of an animated image in the same area for a display period under the AOD mode, such that the animated image is displayed. The control circuit can partition a storage circuit into a plurality of regions for storing the images. The control circuit can write display information of the animated image received from an external device into the partitioned regions during the writing period. The control circuit can stop receiving the display information from the external device and stop writing any display information into the storage circuit during the non-writing period. The external device can be set to be in an idle mode or a sleep mode during the non-writing period. Therefore, the display panel can provide good visual effect under the AOD mode, and the power consumption of the display device can be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driver device, comprising:
a driver circuit, configured to drive a display panel to display an animated image for a first display period under an always on display mode according to display information of the animated image stored in a storage circuit, wherein the first display period comprises a first writing period and a first non-writing period after the first writing period; and
a control circuit, coupled to the storage circuit and configured to write the display information of the animated image received from an external device into the storage circuit during the first writing period of the first display period and stop receiving the display information from the external device and writing any display information into the storage circuit during the first non-writing period of the first display period,
wherein the external device stops transmitting the display information to the control circuit during the first non-writing period of the first display period.

2. The display driver device of claim 1, wherein the display information of the animated image represents a plurality of images to be sequentially displayed in a same area of the display panel during the first display period.

3. The display driver device of claim 2, wherein the control circuit is configured to partition the storage circuit into a plurality of regions and store the images respectively into the regions during the first writing period.

4. The display driver device of claim 3, wherein the control circuit is configured to read the display information stored in the regions of the storage circuit sequentially and drive the display panel to display the animated image by sequentially displaying the images read from the regions of the storage circuit during the first display period.

5. The display driver device of claim 3, wherein the control circuit is configured to obtain location information of the regions respectively storing the display information of the images and read the display information of each of the images according to the location information.

6. The display driver device of claim 3, wherein the control circuit is configured to access the storage circuit according to configuration information comprising at least one of following information: number information indicating a total number of the images of the animation image, timing setting information for reading each of the images of the animation image, and size or address information of the images of the animation image within the storage circuit.

7. The display driver device of claim 3, wherein the control circuit is configured to write the display information of the animation image in at least one dedicated space for storing display information representing images to be displayed under the always on display mode.

8. The display driver device of claim 3, wherein the control circuit is configured to write the display information of the animation image in at least one shared space for storing display information representing images to be displayed under the always on display mode and a normal display mode.

9. The display driver device of claim 2, wherein the control circuit is configured to receive complete display information indicating a merged frame image constructed by the plurality of images from the external device and update the storage circuit by a single time according to the complete display information.

10. The display driver device of claim 2, wherein the control circuit is configured to receive a plurality of different partial display information respectively indicating the plurality of images from the external device and partially update the storage circuit by multiple times respectively according to the different partial display information.

11. The display driver device of claim 1, wherein the display information of the animated image written into the storage circuit during the first writing period represents a plurality of images comprising one or more first images to be displayed during one or more display frames corresponding to the first writing period.

12. The display driver device of claim 1, wherein the display information of the animated image written into the storage circuit during the first writing period represents a plurality of images comprising one or more second images to be displayed during one or more display frames corresponding to the first non-writing period.

13. The display driver device of claim 1, wherein the animated image is a first part image of a whole image displayed on the display panel.

14. The display driver device of claim 13, wherein the driver circuit is further configured to drive the display panel to display a first static image during the first display period and display a second static image in a same area of the display panel where the first static image is displayed during a second display period after the first display period under the always on display mode wherein each of the first static image and the second static image is a second part image of the whole image displayed on the display panel.

15. The display driver device of claim 14, wherein the control circuit is further configured to write display information of the first static image received from the external device into the storage circuit during the first writing period of the first display period, the second display period comprises a second writing period and a second non-writing period after the second writing period, and the control circuit is further configured to update the storage circuit with display information of the second static image received from e external device during the second writing period of the second display period.

16. The display driver device of claim 15, wherein the control circuit is configured to partition the storage circuit into a plurality of first regions and a second region and write a plurality of images represented by the display information of the animated image respectively into the first regions and write the display information of the first static image into the second region during the first writing period of the first display period.

17. The display driver device of claim 16, wherein the driver circuit is configured to drive the display panel to display the animated image for the second display period, and the control circuit is configured to write the display information of the animated image received from the external device into the storage circuit during the second writing period of the second display period and stop receiving the display information from the external device and writing any display information into the storage circuit during the second non-writing period of the second display period.

18. The display driver device of claim 15, wherein each of the first and second static images represents clock information, the display driver device further comprises a real time clock circuit configured to generate each of the first and second static images.

19. The display driver device of claim 13, wherein the driver circuit is configured to drive the display panel to constantly display a static background image.

20. The display driver device of claim 19, wherein the control circuit is configured not to write display information of the static background image during the first writing period of the first display period.

21. The display driver device of claim 20, wherein the control circuit is further configured to generate display information indicating the static background image.

22. The display driver device of claim 1, wherein the driver circuit is configured to drive the display panel to display the animated image when the external device is in an idle mode or a sleep mode.

23. The display driver device of claim 1, wherein the storage circuit is a frame buffer disposed within the display driver device.

24. The display driver device of claim 1, wherein the control circuit is configured to determine whether to read the display information of the animation image from the storage circuit according to information indicating a starting address for displaying the animation image.

25. A display device, comprising:
an external device, configured to output display information of an animated image
a storage circuit, configured to store the display information of the animated image;
a display panel, configured to display the animated image according to the display information of the animated image stored in the storage circuit; and
a display driver device, coupled to the storage circuit and configured to
drive the display panel to display the animated image for a first display period under an always on display mode, wherein the first display period comprises a first writing period and a first non-writing period after the first writing period; and
write the display information of the animated image received from the external device into the storage circuit during the first writing period of the first display period and stop receiving the display information from the external device and writing any display information into the storage circuit during the first non-writing period of the first display period,
wherein the external device stops transmitting the display information to the control circuit during the first non-writing period of the first display period.

26. The display device of claim 25, wherein the display driver device comprises:
a driver circuit, configured to drive the display panel to display the animated image for the first display period under the always on display mode; and
a control circuit, coupled to the storage circuit and configured to write the display information of the animated image received from an external device into the storage circuit during the first writing period of the first display period and stop receiving the display information from the external device and writing any display information into the storage circuit during the first non-writing period of the first display period.

27. The display device of claim 26, wherein the display information of the animated image represents a plurality of images to be sequentially displayed in a same area of the display panel during the first display period.

28. The display device of claim 27, wherein the control circuit is configured to partition the storage circuit into a plurality of regions and store the images respectively into the regions during the first writing period.

29. The display device of claim 27, wherein the control circuit is configured to receive complete display information indicating a merged frame image constructed by the plurality of images from the external device and update the storage circuit by a single time according to the complete display information.

30. The display device of claim 27, wherein the control circuit is configured to receive a plurality of different partial display information respectively indicating the plurality of images from the external device and partially update the storage circuit by multiple times respectively according to the different partial display information.

31. The display device of claim 26, wherein the display information of the animated image written into the storage circuit during the first writing period represents a plurality of images including one or more first images to be displayed during one of more display frames corresponding to the first writing period.

32. The display device of claim 26, wherein the display information of the animated image written into the storage circuit during the first writing period represents a plurality of images including one or more second images to be displayed during one or more display frames corresponding to the first non-writing period.

33. The display device of claim 26, wherein the driver circuit is configured to drive the display panel to display the animated image when the external device is in an idle mode.

34. The display device of claim 26, wherein the storage circuit is a frame buffer disposed within the display driver device or within the display device but outside of the display driver device.

35. The display device of claim 26, wherein the control circuit is configured to determine whether to read the display information of the animation image from the storage circuit according to information indicating a starting address for displaying the animation image.

36. The display device of claim 25, wherein the external device is an application processor or an external storage device outside of the display driver device.

37. An operating method for a display driver device, comprising:
  driving a display panel to display an animated image for a display period under an always on display mode according to display information of the animated image stored in a storage circuit, wherein the display period comprises a writing period and a non-writing period after the writing period; and
  writing the display information of the animated image received from an external device into the storage circuit during the writing period of the first display period and stopping receiving the display information from the external device and writing any display information into the storage circuit during the non-writing period of the display period,
  wherein the display information is stopped from being transmitted during the first non-writing period of the first display period.

38. The operating method for the display driver device of claim 37, wherein the display information of the animated image represents a plurality of images to be sequentially displayed in a same area of the display panel during the display period.

39. The operating method for the display driver device of claim 37, wherein the control circuit is configured to partition the storage circuit into a plurality of regions and store the images respectively into the regions during the writing period.

40. The operating method for the display driver device of claim 37, wherein the display information of the animated image written into the storage circuit during the writing period represents a plurality of images comprising one or more first images to be displayed during one or more display frames corresponding to the writing period.

41. The operating method for the display driver device of claim 37, wherein the display information of the animated image written into the storage circuit during the writing period represents a plurality of images comprising one or more second images to be displayed during one or more display frames corresponding to the non-writing period.

* * * * *